Patented Jan. 2, 1923.

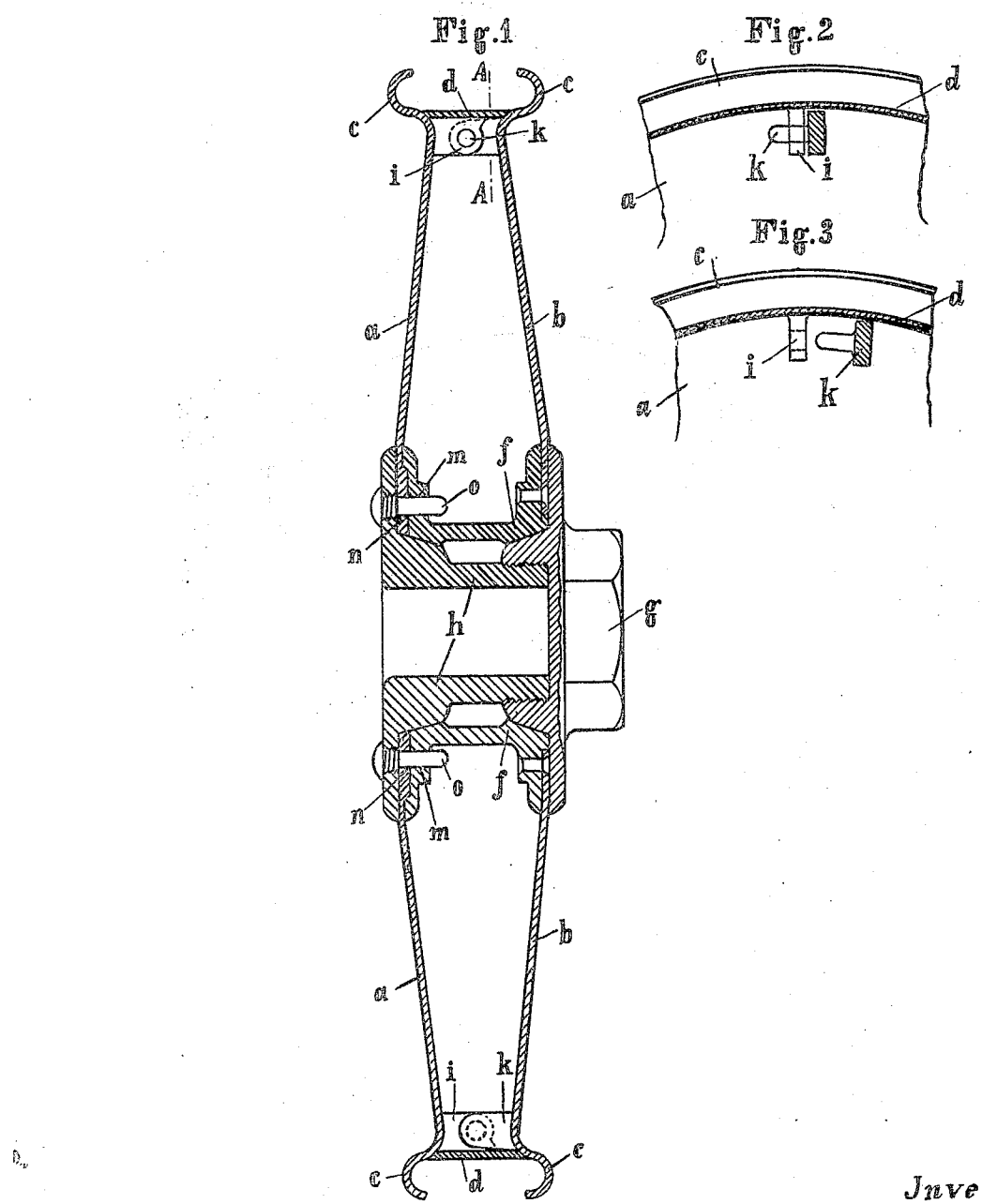

1,441,134

UNITED STATES PATENT OFFICE.

PETER THEISEN AND FRANZ THEISEN, OF ELBERFELD, GERMANY.

VEHICLE WHEEL WITH PNEUMATIC TIRE.

Application filed August 26, 1921. Serial No. 495,554.

*To all whom it may concern:*

Be it known that we, PETER THEISEN and FRANZ THEISEN, both citizens of the German Republic, and both residing at Elberfeld, Rhenish Prussia, Germany, have invented certain new and useful Improvements in Vehicle Wheels with Pneumatic Tires, of which the following is a specification.

This invention relates to a double-disc wheel with a divided rim, both discs of which are joined together both at the hub and at the rim. The essential feature of the invention consists in the fact that the connection between the two discs in the neighbourhood of the rim is effected by means of coupling members arranged on the discs, the said coupling members being brought into engagement with one another by relative rotation of the two discs, the known catch pegs or drivers fitted to the rim serving at the same time to secure the discs, when once coupled together, against relative rotation.

The invention consists further in the fact that the two discs jointly are detachably secured to the hub by means of the wheel cap, and that one of the discs is provided, in the vicinity of the hub, with one or more perforated distance pieces, while the other is provided with an equal number of holes, which when the coupling members mutually engage one another, register with the holes in the distance piece or pieces, the known catch pegs fitted to the hub passing through the holes in one disc and into the holes in the distance piece or pieces, when the discs are applied to the hub.

The new double-disc wheel is distinguished from the known double-disc wheels with divided rims and discs connected with one another both at the hub and at the rim by its simple construction and the special guarantees for the connecting devices, as well as by the simplicity with which it can be assembled and dismounted, as this can be done by a novice without special instruction. In addition there is the advantage that for the purpose of changing the tire both discs can be detached from the hub, which remains on the axletree, then, after the new tire is put on, connected together independently of the hub, and then pushed on to the hub again jointly, the changing of the tire being thereby materially facilitated. Furthermore, there is the possibility of carrying spare tires mounted on spare wheels, in which case the spare wheels to be carried need only consist of the two discs.

One constructional form of the subject-matter of the invention is illustrated in the drawing, wherein the new double-disc wheel is shown in axial section in Figure 1, while Figures 2 and 3 reproduce part of the outer wheel rim in section on the line A—A in Figure 1, the coupling of the two discs being closed in Figure 2 and detached in Figure 3.

The new wheel consists of the two discs $a$ and $b$, each of which carries at its circumference a rim flange $c$, $c$, while to one disc, $a$, the rim band $d$ is also fastened. The two discs are maintained at the correct distance apart, at the rim by means of a rim band $d$ and at the hub by means of a distance sleeve $f$ provided with two flanges. The distance sleeve $f$, which might also be designated an outer hub, is secured to the disc $b$ by means of a number of rivets. The two discs $a$ and $b$ jointly are detachably secured by means of the wheel cap or nut $g$, to the true hub $h$, which is rotatably but not displaceably journalled on the axletree and which might also be designated the inner hub, by being gripped between a flange of the hub $h$ and a flange of the nut or wheel cap $g$. By this means the discs $a$ and $b$ are secured to the hub and at the same time to one another. The connecting of the discs at the rim, on the other hand, is effected by a number of eyes or lugs $i$ provided on the disc $a$ and an equal number of hooks $k$ arranged on the disc $b$ in the circumferential direction of the wheel, the said hooks, after the removal of the discs from the hub $h$, being brought into engagement with the eyes $i$ by relative rotation of the two discs $a$ and $b$.

In order to secure the discs against relative rotation after engagement of the hooks $k$ in the eyes $i$, the flange of the distance sleeve or outer hub $f$ is provided with a number of holes $n$, while the disc $a$ contains on its inner edge an equal number of holes $n$, which register with the holes $m$ when the coupling hooks $k$ engage with the eyes $i$. Finally, on the flange of the inner hub $h$, catch pegs $o$ are arranged, the number and arrangement of which correspond to those of the holes $m$ and $n$. If the two discs $a$ and $b$, after coupling is effected by means of the hooks and eyes $k$, $i$, are pushed on to the hub $h$, the catch pegs $o$ pass right through the holes in the disc $h$ and into the holes in the distance sleeve $f$ or its flange and thereby secure the discs $a$ and $b$ against relative rotation, that is to say, against the releasing of the coupling consisting of the hooks and eyes $k$, $i$.

At the same time the catch pegs serve, but also in a known manner, to couple the discs to the hub $h$, to compel them to rotate together.

In order that the detachable part of the wheel, consisting of the discs $a$, $b$ on the sleeve $f$, may be securely seated on the hub $h$ journalled on the axletree, the hub $h$ and the nut or wheel cap $g$ may advantageously be provided, as shown, each with a cone, which fits closely into a corresponding internal cone in the distance sleeve or outer hub $f$.

As will be obvious both discs can be removed together, after releasing the wheel cap $g$, for the purpose of changing the tire from the hub $h$, which remains on the axletree, and can then be released from one another. After fitting the new tire, they can be connected together independently of the hub and can be slipped as a whole on to the hub, whereupon they are again secured to the hub by screwing up the wheel cap. The changing of the tire is thereby very materially simplified and facilitated. Hence the work can be done without further instruction even by unskilled persons. Then again, in consequence of the fact that the holes in the disc $a$ have to register with the holes in the flanges of the distance sleeve when the discs are being applied to the hub, a guarantee is given at the same time that the discs can only be fastened to the hub when they are firmly coupled by means of the coupling members $i$, $k$. The danger of accidents arising from the incomplete uniting of the wheel is thereby eliminated. Of course the spare tires can be carried already mounted on spare wheels. In this case the invention affords the advantage that the spare wheels only need consist of the two discs and the distance sleeve and therefore do not weigh much, and that the changing of the wheels can be effected in an exceedingly simple manner, viz: by releasing the wheel cap.

The hub $h$ may be journalled in any known manner, by means of a number of ball bearings for example, on the stationary axletree.

Various modifications and alterations of our invention will suggest themselves to those skilled in the art, and we do not desire to be limited to the exact details of construction shown and described.

We claim:

1. In a vehicle wheel in combination a hub adapted to be journalled on the axletree, two discs detachably mounted on the said hub, coacting means arranged on both discs in the neighborhood of the rim for coupling the two discs, said means adapted to be brought into engagement by the relative rotation of the two discs, and means arranged on the hub for positively securing the discs against relative rotation.

2. In a vehicle wheel in combination: a hub adapted to be journalled on the axletree, two discs detachably mounted on the said hub, coacting coupling members arranged on both discs in the neighborhood of the rim for coupling the two discs, said means adapted to be brought into engagement by the relative rotation of the two discs, while detached from the hub, and catch pegs arranged on the hub adapted to engage both discs for coupling said discs to the hub and simultaneously securing the discs against relative rotation.

3. In a vehicle wheel in combination: a hub adapted to be journalled on the axletree, two discs detachably mounted on said hub, coacting coupling members arranged on both discs in the neighborhood of the rim for coupling the two discs, said means adapted to be brought into engagement by the relative rotation of the two discs while detached from the hub, a distance piece secured to the one disc, said distance pieces being perforated to correspond to and register with holes in the second disc when the said coupling members are engaged, and catch pegs arranged on the hub passing right through the holes in the second disc and into the holes on the distance piece when the discs are fitted to the hub.

4. In a vehicle wheel with pneumatic tire: a hub journalled on the axle-tree, two discs detachably mounted on said hub, a divided rim attached partly to the one and partly to the other disc, coacting coupling members arranged on both discs in the neighborhood of the rim for coupling the two discs, said coupling members being brought into engagement by the relative rotation of the two discs while detached from the hub, a perforated distance piece or pieces secured to the one disc, said distance pieces being perforated to correspond to and register with holes in the second disc when the coupling members are engaged, catch pegs arranged on the hub and passing right through the holes in the second disc and into the distance piece when the said discs are fitted to the hub, and a wheel cap securing the two discs jointly to the hub.

In testimony whereof, we affix our signatures in the presence of two witnesses.

PETER THEISEN.
FRANZ THEISEN.

Witnesses:
LE SECRETAIRE,
P. A. THÁYCAE.